United States Patent
Eck et al.

(10) Patent No.: US 6,792,969 B2
(45) Date of Patent: Sep. 21, 2004

(54) PRESSURE REGULATOR

(75) Inventors: Karl Eck, Frankfurt (DE); Otto Korst, Herschbach (DE)

(73) Assignee: Siemens Aktiengesellschaft, Munich (DE)

(*) Notice: Subject to any disclaimer, the term of this patent is extended or adjusted under 35 U.S.C. 154(b) by 149 days.

(21) Appl. No.: 10/168,868

(22) PCT Filed: Aug. 16, 2001

(86) PCT No.: PCT/DE01/03135

§ 371 (c)(1),
(2), (4) Date: Jun. 26, 2002

(87) PCT Pub. No.: WO02/25392

PCT Pub. Date: Mar. 28, 2002

(65) Prior Publication Data

US 2003/0056831 A1 Mar. 27, 2003

(30) Foreign Application Priority Data

Sep. 21, 2000 (DE) .......................................... 100 46 736

(51) Int. Cl.⁷ .......................... G05D 16/08; F16K 17/02
(52) U.S. Cl. ............................ 137/315.04; 137/315.05; 137/510

(58) Field of Search ............................ 137/510, 315.04, 137/315.05, 15.18, 15.19; 123/459, 463

(56) References Cited

U.S. PATENT DOCUMENTS

| 1,247,411 A | * | 11/1917 | Laible ........................ 24/613 |
| 3,858,164 A | * | 12/1974 | Leonard ..................... 439/329 |
| 4,625,695 A | * | 12/1986 | Tuckey ....................... 123/463 |
| 4,646,700 A |   | 3/1987  | Tuckey ....................... 137/510 |
| 5,518,018 A | * | 5/1996  | Roetker ........................ 137/43 |
| 5,785,080 A |   | 7/1998  | Herbst ........................ 137/510 |

FOREIGN PATENT DOCUMENTS

EP            0 314 878 A2     5/1989

\* cited by examiner

*Primary Examiner*—Stephen M. Hepperle
(74) *Attorney, Agent, or Firm*—Morrison & Foerster LLP

(57) ABSTRACT

A pressure regulator has a closing member which controls a pressure-medium inlet and on which is supported a valve spring arranged in a spring can. The spring can includes a casing part and of a lid. The valve spring is supported with one end against the lid. The lid is pushed into the casing part until the necessary spring force is set exactly and is then connected to the casing surface of the casing part by means of radial indentations.

2 Claims, 1 Drawing Sheet

PRESSURE REGULATOR

CLAIM FOR PRIORITY

This is a U.S. national stage of PCT/DE01/03135 filed Aug. 16, 2001 which claims priority to German application 10046736.9 filed Sep. 21, 2000.

TECHNICAL FIELD OF THE INVENTION

The invention relates to a pressure regulator with a closing member, and in particular, to a pressure regulator with a closing member on which is supported a valve spring which bears with its other end against an upper end face of a spring can.

BACKGROUND OF THE INVENTION

Pressure regulators are typically installed, for example, in present-day motor vehicles For many applications, it is necessary that the opening force of the closing member of the pressure regulator, and therefore the pressure regulated by the regulator, are as exact as possible despite unavoidable manufacturing, tolerances. This is accomplished during manufacture by a calibrating operation. During this operation, a check is made as to the pressure at which the pressure regulator opens. Then, in order to set the pressure point, the end face of the spring can is pressed into the spring can such that the valve spring is appropriately tensioned.

It has been shown, however, that such regulators can be calibrated only in a complicated way and with relatively high inaccuracies. This is, primarily, because the spring can pressed in on the end face, after being pressed in, inevitably springs back by an amount resulting from material elasticities. It is therefore necessary, during the pressing-in operation, to overrun the calibrating point somewhat and hope that, after the springback, the correct opening pressure is obtained. It is not possible, in this case, to avoid a situation where the pressed-in portion occasionally springs back less than expected and too high an opening pressure is therefore set. Such a fault can no longer be rectified subsequently by recalibration.

SUMMARY OF THE INVENTION

The invention discloses a pressure regulator such that it is possible to carry out calibration which is as accurate as possible.

In one embodiment of the invention, the spring can includes a casing part and a lid. The lid is connected to the casing surface of the casing part in a position fixing a desired spring force.

During the calibrating operation, the lid can be displaced axially relative to the casing part until the desired spring force is set, the lid then being connected to the casing part. Since this connection is made on the casing surface of the casing part, the lid will not spring back, so that the spring force can be set very accurately.

In an alternative embodiment, the lid can be designed as a component to be slipped over the casing part or as a component bridging the casing part. It is configured in a particularly simple way if it is pushed into the casing part and comes to bear with a flanged edge against the casing surface on the inside.

In another embodiment, the lid can be connected to the casing part in very different ways, for example by means of screws or rivets leading radially into the casing part or by welding, soldering or adhesive bonding. A very simple connection is obtained when, according to another embodiment of the invention, the casing surface of the casing part has indentations engaging into the edge of the lid.

In still another embodiment, the lid can be connected to the casing part particularly accurately in the position found during calibration, when the indentations are individual tabs which are formed by U-shaped incisions into the casing surface and by pressing the material delimited by the incisions into the edge of the lid.

Alternatively, the indentations may be formed by protuberances in the form of a spherical cap, the protuberances of the casing surface of the casing part and of the edge engaging into each other.

BRIEF DESCRIPTION OF THE DRAWINGS

The invention permits various embodiments. In order to make its basic principle even clearer, one of these and a modified detail are illustrated in the drawing and are described below. In the drawings.

DETAILED DESCRIPTION OF THE PREFERRED EMBODIMENTS

Figure 1:
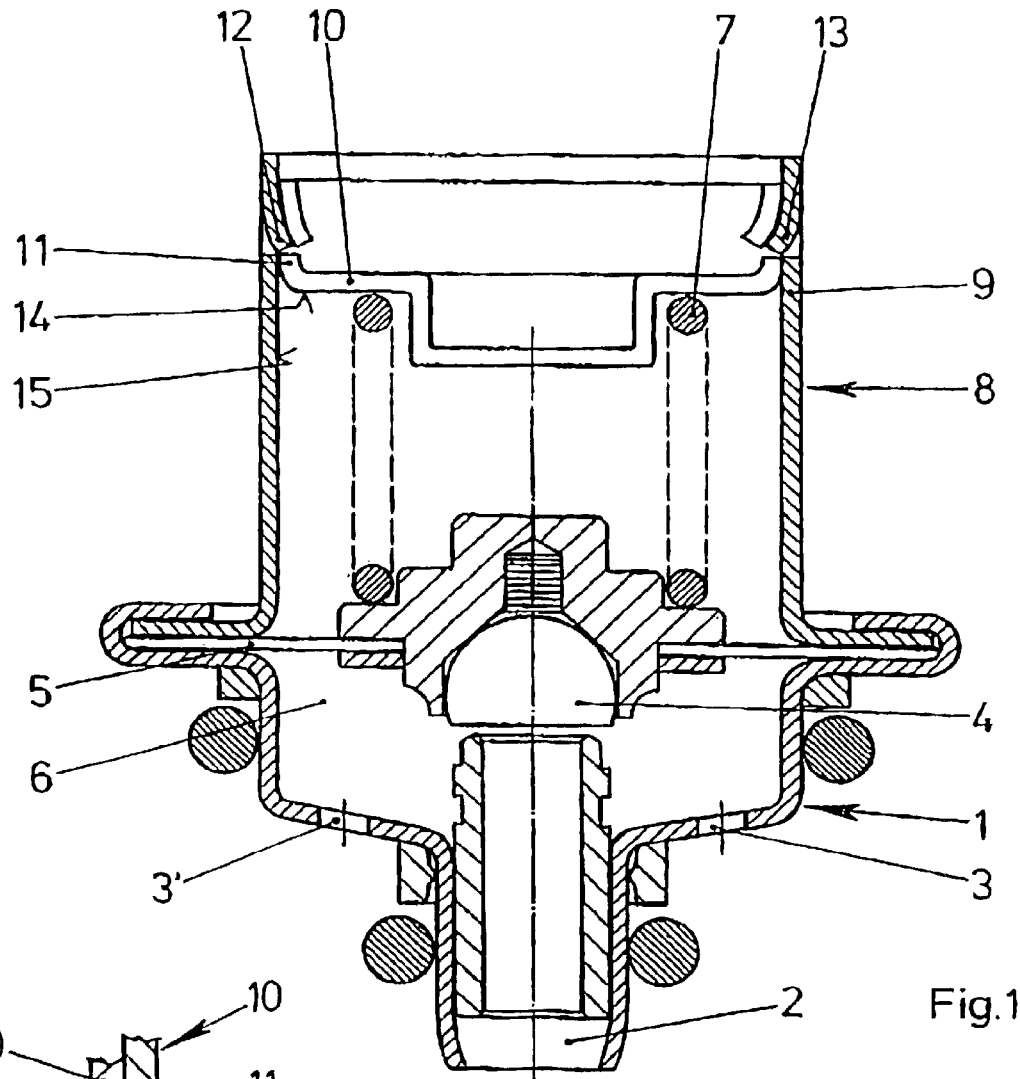
FIG. 1 shows a longitudinal section through a pressure regulator according to the invention.

The pressure regulator shown in FIG. 1 has a housing 1 with a pressure-medium inlet 2 and a plurality of pressure-medium outlets 3, 3'. Above the pressure-medium inlet 2 is arranged a closing member 4 which blocks the pressure-medium inlet 2 below a fixed pressure.

The closing member 4 is held by a diaphragm 5 which closes off a pressure space 6 upwardly. The closing member 4 is pre-stressed in the closing direction with an exactly defined force by a valve spring 7. The valve spring 7 is arranged in a spring can 8 which is connected to the housing 1 and which includes a casing part 9 and of a lid 10. The lid 10 has an upwardly directed edge 11 which bears against the inner casing surface 15 of the casing part 9 and which is connected to the casing surface 15 of the casing part 9 by means of a plurality of indentations 12, 13 distributed over the circumference of the casing part. Furthermore, the lid 10 has an inner end face 14, against which the valve spring 7 bears.

Figure 2:
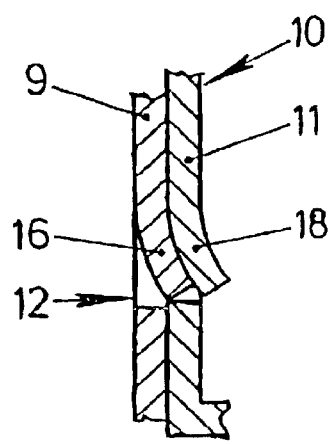
FIG. 2 shows a longitudinal section on an enlarged scale through the connection region between a casing part and a lid of the pressure regulator.
Figure 3:
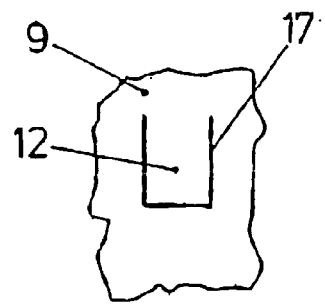
FIG. 3 shows a side view of the region according to FIG. 2.

FIGS. 2 and 3 illustrate that the indentations 12, 13 each have a tab 16 which engages from the casing part 9 into the edge 11 of the lid 10. For this purpose, the casing part 9 receives in each case a U-shaped incision 17, as shown in FIG. 3. The tabs 16 can be pressed in by means of the same tool with which the incisions 17 are also formed. Such a tool presses, at the same time as the tab 16, a corresponding tab 18 of the edge 11 inwards.

Figure 4:
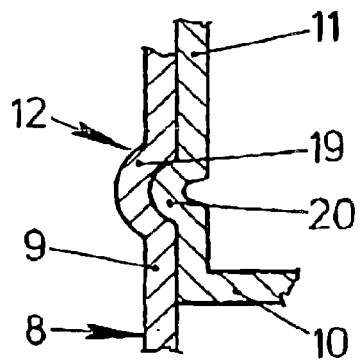
FIG. 4 shows a longitudinal section on an enlarged scale through a connection region modified in relation to FIG. 2.

FIG. 4 shows that the indentations 12 and 13 may also be formed by protuberances 19, 20 of the lid 10 and of the wall of the casing part 9 which are in the form of a spherical cap and engage one into the other.

What is claimed is:

1. A pressure regulator with a closing member, comprising:
 a valve spring supported on the member at a first end and which bears with a second end against an upper end face of a spring can;

the closing member having a device for calibrating the tensioning force of the valve spring; and the spring can including a casing part and a lid, wherein the lid is connected to a surface of the casing part in a position fixing a desired spring force, the lid is pushed into the casing part and bears with a flanged edge against the casing surface on an inside, the casing surface of the casing, part has indentations engaging into the edge of the lid, and the indentations have individual tabs which are formed by U-shaped incisions into the casing surface and by pressing the material delimited by the incisions into the edge of the lid.

2. The pressure regulator according to claim 1, wherein the indentations are formed by protuberances in the form of a spherical cap, the protuberances of the casing surface of the casing part and of the edge engaging into each other.

* * * * *